United States Patent
Fish

(10) Patent No.: US 10,689,528 B2
(45) Date of Patent: *Jun. 23, 2020

(54) HIGH PERFORMANCE SILICON BASED THERMAL COATING COMPOSITIONS

(71) Applicant: Burning Bush Group, LLC, Kansas City, MO (US)

(72) Inventor: Chris Fish, Kansas City, MO (US)

(73) Assignee: Burning Bush Group, LLC, Kansas City, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/165,537

(22) Filed: Oct. 19, 2018

(65) Prior Publication Data

US 2019/0048209 A1 Feb. 14, 2019

Related U.S. Application Data

(63) Continuation of application No. 13/891,438, filed on May 10, 2013, now Pat. No. 10,138,381.

(60) Provisional application No. 61/645,487, filed on May 10, 2012.

(51) Int. Cl.
| | |
|---|---|
| C09D 5/18 | (2006.01) |
| C09D 183/14 | (2006.01) |
| C08G 77/04 | (2006.01) |
| C08G 77/54 | (2006.01) |

(52) U.S. Cl.
CPC ............ *C09D 5/18* (2013.01); *C09D 183/14* (2013.01); *C08G 77/04* (2013.01); *C08G 77/54* (2013.01)

(58) Field of Classification Search
CPC ...... C08G 77/04; C08G 77/54; C09D 183/14; C09D 5/18
See application file for complete search history.

(56) References Cited

U.S. PATENT DOCUMENTS

| | | |
|---|---|---|
| 2,859,137 A | 11/1958 | Ellis |
| 3,419,514 A | 12/1968 | Hadlock |
| 3,445,276 A | 5/1969 | Pikula |
| 4,288,356 A | 9/1981 | Huebner |
| 4,298,559 A | 11/1981 | Baney |
| 4,349,609 A | 9/1982 | Takeda |
| 4,386,117 A | 5/1983 | Gordon |
| 4,510,283 A | 4/1985 | Takeda |
| 4,529,629 A | 7/1985 | Liu |
| 4,562,091 A | 12/1985 | Sachdev |
| 4,670,057 A | 6/1987 | Oezelli |
| 4,685,930 A | 8/1987 | Kasprzak |
| 4,686,135 A | 8/1987 | Obayashi |
| 4,844,986 A | 7/1989 | Karakelle |
| 4,886,860 A | 12/1989 | Arai |
| 4,946,920 A | 8/1990 | Vaahs |
| 5,043,789 A | 8/1991 | Linde |
| 5,086,127 A | 2/1992 | Itoh |
| 5,162,407 A | 11/1992 | Turner |
| 5,364,920 A | 11/1994 | Bujalski |
| 5,489,479 A | 2/1996 | Lucas |
| 5,599,892 A | 2/1997 | Hayashida |
| 5,605,958 A | 2/1997 | Yoneda |
| 5,668,212 A | 9/1997 | Naito |
| 5,907,019 A | 5/1999 | Itoh |
| 5,919,572 A | 7/1999 | Blum |
| 6,013,752 A | 1/2000 | Mowrer |
| 6,255,373 B1 | 7/2001 | Akamatsu |
| 6,329,487 B1 | 12/2001 | Abel |
| 6,534,184 B2 | 3/2003 | Knasiak |
| 6,562,465 B1 | 5/2003 | Nakashima |
| 6,646,039 B2 | 11/2003 | Li |
| 6,706,798 B2 | 3/2004 | Kobayashi |
| 6,734,250 B2 | 5/2004 | Azechi |
| 6,756,469 B2 | 6/2004 | Lukacs, III |
| 6,916,529 B2 | 7/2005 | Pabla |
| 7,462,668 B2 | 12/2008 | Lu |
| 7,476,970 B2 | 1/2009 | Ozaki |
| 7,527,872 B2 | 5/2009 | Steele |
| 7,566,500 B2 | 7/2009 | Kohama |
| 7,687,150 B2 | 3/2010 | Simendinger, III |

(Continued)

FOREIGN PATENT DOCUMENTS

| | | |
|---|---|---|
| CN | 101153078 | 4/2008 |
| CN | 101768420 | 7/2010 |

(Continued)

OTHER PUBLICATIONS

Birot, M. et al., "Comprehensive Chemistry of Polycarbosilanes, Polysilazanes, and Polycarbosilazanes as Precursors of Ceramics," Chemistry Reviews, 95:1443-1477 (1995).
Declaration of Christopher Fish Under 37 C.F.R. § 1.131, date of signatory Sep. 24, 2017; 7 pages.
Dow Corning(R) US-CF-2403 Resin. Material Safety Data Sheet. Dow Corning Corporation, May 2013, p. 2. Retrieved from the Internet: <URL: http://www.specialchem4coatings.com/tds/dow-corning-us-cf-2403-resin/dow-corning/42805/ind ex.aspx>.
International Application No. PCT/US2013/038644; International Preliminary Report on Patentability, dated Oct. 28, 2014; 10 pages.
International Application No. PCT/US2013/038644; International Search Report and Written Opinion of the International Searching Authority, dated Jan. 28, 2014; 11 pages.

(Continued)

*Primary Examiner* — Shuangyi Abu Ali
(74) *Attorney, Agent, or Firm* — Global Patent Group, LLC; Dennis A. Bennett; Clifford A. Schlecht

(57) ABSTRACT

The present disclosure provides silicon-based coating compositions, comprising 8% to 30% (w/w of the total composition) polysilazane, 8% to 22% (w/w of the total composition) polysiloxane, and 30% to 45% (w/w of the total composition) high temperature silicone-based resin. The composition after curing is a thermal barrier coating that can withstand temperature over 1600° F. in accordance with ASTM E1530 test standards for heat stability, having a thickness ranging between about 0.4 mil and about 1.5 mil and a hardness ranging between about 4H and about 9H. Also provided are methods for applying these coatings.

20 Claims, No Drawings

(56) References Cited

U.S. PATENT DOCUMENTS

| | | | |
|---|---|---|---|
| 7,687,913 B2 | 3/2010 | Chakrapani | |
| 7,709,574 B2 | 5/2010 | Wan | |
| 7,727,635 B2 | 6/2010 | Furuya | |
| 7,754,003 B2 | 7/2010 | Aoki | |
| 7,815,864 B2 | 10/2010 | Betz | |
| 7,857,905 B2 | 12/2010 | Hayes | |
| 7,887,881 B2 | 2/2011 | Lu | |
| 8,232,234 B2 | 7/2012 | Raj | |
| 8,535,761 B2 | 9/2013 | Laine | |
| 8,563,409 B2 | 10/2013 | Morita | |
| 9,006,355 B1 * | 4/2015 | Fish | C08L 83/16 525/477 |
| 9,505,949 B2 * | 11/2016 | Fish | C08L 83/00 |
| 9,856,400 B2 * | 1/2018 | Fish | C09D 183/16 |
| 10,138,381 B2 * | 11/2018 | Fish | C09D 5/18 |
| 10,301,507 B2 * | 5/2019 | Fish | C09D 183/16 |
| 2002/0015851 A1 | 2/2002 | Higuchi | |
| 2003/0083453 A1 | 5/2003 | Lukacs | |
| 2003/0109633 A1 | 6/2003 | Kobayashi | |
| 2005/0239953 A1 | 10/2005 | Sakurai | |
| 2006/0121266 A1 | 6/2006 | Fandel | |
| 2006/0194707 A1 | 8/2006 | Lu | |
| 2006/0205861 A1 | 9/2006 | Gordon | |
| 2008/0015292 A1 | 1/2008 | Lens | |
| 2008/0178536 A1 | 7/2008 | Johnson | |
| 2008/0305611 A1 | 12/2008 | Hirota | |
| 2009/0253884 A1 | 10/2009 | Ogawa | |
| 2010/0075057 A1 | 3/2010 | Krannich | |
| 2010/0163791 A1 | 7/2010 | Fukui | |
| 2010/0178521 A1 | 7/2010 | Byrne | |
| 2010/0279906 A1 | 11/2010 | Schwarz | |
| 2010/0297903 A1 | 11/2010 | Thiria | |
| 2010/0304152 A1 | 12/2010 | Clarke | |
| 2011/0033708 A1 | 2/2011 | Harimoto | |
| 2011/0086958 A1 | 4/2011 | Lortz | |
| 2011/0171447 A1 | 7/2011 | Krishnamoorthy | |
| 2011/0195259 A1 | 8/2011 | Song | |
| 2012/0107559 A1 | 5/2012 | Ferrar | |
| 2012/0141770 A1 | 6/2012 | Cadet | |
| 2012/0252923 A1 | 10/2012 | Serobian | |
| 2013/0112379 A1 | 5/2013 | Ko | |
| 2013/0122763 A1 | 5/2013 | Fish | |
| 2013/0287959 A1 | 10/2013 | Fish | |
| 2013/0302526 A1 | 11/2013 | Fish | |
| 2014/0011009 A1 | 1/2014 | Fish | |
| 2014/0234534 A1 | 8/2014 | Fish | |

FOREIGN PATENT DOCUMENTS

| | | |
|---|---|---|
| EP | 0495325 | 7/1992 |
| EP | 1217058 | 6/2002 |
| WO | 1992020634 | 11/1992 |
| WO | 2005108543 | 11/2005 |
| WO | 2008134243 | 11/2008 |
| WO | 2011071698 | 6/2011 |
| WO | 2013170124 | 11/2013 |
| WO | 2014008443 | 1/2014 |
| WO | 2014014542 | 1/2014 |
| WO | 2014130774 | 8/2014 |
| WO | 2015050586 | 4/2015 |
| WO | 2015051301 | 4/2015 |

OTHER PUBLICATIONS

International Application No. PCT/US2013/040501; International Preliminary Report on Patentability, dated Nov. 11, 2014; 10 pages.
International Application No. PCT/US2013/040501; International Search Report and Written Opinion of the International Searching Authority, dated Sep. 30, 2013; 11 pages.
International Application No. PCT/US2013/049398; International Preliminary Report on Patentability, dated Jan. 6, 2015; 14 pages.
International Application No. PCT/US2013/049398; International Search Report and Written Opinion of the International Searching Authority, dated Dec. 20, 2013; 14 pages.
International Application No. PCT/US2014/017596; International Preliminary Report on Patentability, dated Aug. 25, 2015; 7 pages.
International Application No. PCT/US2014/017596; International Search Report and Written Opinion of the International Searching Authority, dated Jun. 5, 2014; 8 pages.
International Application No. PCT/US2014/039684; International Preliminary Report on Patentability, dated Sep. 2, 2015; 27 pages.
International Application No. PCT/US2014/039684; International Search Report and Written Opinion of the International Searching Authority, dated Nov. 19, 2014; 14 pages.
International Application No. PCT/US2014/059139; International Preliminary Report on Patentability, dated Apr. 5, 2016; 14 pages.
International Application No. PCT/US2014/059139; International Search Report and Written Opinion of the International Searching Authority, dated Jan. 2, 2015; 16 pages.
KADKLAD RX23, www.kadko.com/products.html, Retrieved Jan. 14, 2014.
Oshita, J et al. Synthesis of Poly{[bis(ethynylphenyl)silylene]phenylene}s with Highly Heat-Resistant Properties. Macromolecules. Aug. 1999, vol. 32, No. 19, pp. 5998-6002.
U.S. Appl. No. 13/891,438; Final Office Action, dated Jun. 2, 2017; 13 pages.
U.S. Appl. No. 13/891,438; Non-Final Office Action, dated Aug. 11, 2016; 20 pages.
U.S. Appl. No. 13/891,438; Non-Final Office Action, dated Mar. 30, 2018; 10 pages.
U.S. Appl. No. 13/891,438; Notice of Allowance, dated Jul. 27, 2018; 8 pages.

* cited by examiner

HIGH PERFORMANCE SILICON BASED THERMAL COATING COMPOSITIONS

CROSS REFERENCE

This application is a continuation of U.S. patent application Ser. No. 13/891,438, filed on May 10, 2013, and titled "High Performance Silicon Based Thermal Coating Compositions," which claims the priority benefit of U.S. provisional application 61/645,487, filed on May 10, 2012, and the teachings of which are incorporated herein by reference in their entities for all purposes.

TECHNICAL FIELD

The present disclosure relates to silicon-based coating compositions formed from silazane, siloxane, and silane, and optionally, organic solvents and additives. The resultant composition can be used for coating a surface to form coatings having desired features including high temperature and heat resistance, and good hardness. Such coatings are useful in a wide range of applications.

BACKGROUND

Chemical structure and conformation of the polymer are among the many factors that influence the type of coating for a particular application. However, the commercial availability of many useful polymers often limits the applications. For example, for a long time polysilazanes have been synthesized and characterized, which acknowledges that such a polymer could be useful in a variety of applications. Currently, however, few products have been developed into a marketable commodity. Additionally, there are cost limitations that prohibit use in some cases.

There is a great need for an improved silicon-based coating for use in a wide range of applications. Such coating would be curable at ambient temperature conditions without requiring an added catalyst or activator for rapid curing, thin but durable, protective and heat-stable, displaying excellent hardness, remaining intact even when the substrate is deformed. In addition, coatings that are customizable in terms of coating color, appearance, feel, and glossiness are desirable. Further, coatings being UV resistant, microbial releasable, easy to clean and maintain, and corrosion resistant are also in great need for their wide range of uses.

Therefore, given the limitations of the prior art, it is desirable to have a coating composition that has the physical and chemical characteristics of the polymer substrates, and results in coatings possessing a number of desirable properties along with superior heat and high temperature resistance than the existing silicone-based paint or coating, such as Thurmalox® products, which withstand temperature up to 1200° F.

SUMMARY

The present disclosure relates to silicon-based coating compositions applicable to a wide range of surfaces, which composition is formed from a mixture of constituents comprising appropriate portions of polymerized silazane resin, polymerized siloxane resin, polymerized silane resin, high temperature silicone-based resins, and optionally, portions of organic solvent and additives. The resultant coating has a thickness of 0.4 to 1.5 mil (1 mil=0.001 inches or 25.4 µm), a hardness of 4-9H (H, hardness; using ASTM D3363 test standards), and a continuous temperature endurance above 1600° F. Such combinations having specific portions of silicon-based polymers provide coatings having advantageous properties including, but not limited to, clear, thin, light, slick, hard, high heat and high temperature resistant, ice build-up resistant, UV resistant, chemical resistant, and microbial resistant. In addition, the compositions as provided herein allow for a lower concentration of polymerized silazane resin and thus reduce the cost, simplify mixing steps and processes, and decrease in odor of the finished coating products.

Generally, the silicon-based coating composition, which after curing, is a thermal barrier coat composition that can withstand continuous temperature over 1600° F., having a thickness ranging between about 0.4 mil and about 1.5 mil and a hardness ranging between about 4H and about 9H. The general composition is formed from a mixture of constituents comprising: between about 1% (w/w) and about 80% (w/w) silazane, between about 1% (w/w) and about 30% (w/w) siloxane, between about 1% (w/w) and about 30% (w/w) silane, and between about 1% (w/w) and about 90% (w/w) high temperature silicone based resin.

One embodiment relates to a silicon based coating composition comprising between about 1% and about 99% (w/w), by weight of the total composition, of a first mixture containing: 60% to 70% (w/w) silazane; 12% to 22% (w/w) siloxane; 12% to 22% (w/w) silane, by weight of the first mixture; and 1% to 99% (w/w), by weight of the total composition, of a second mixture containing: 77% to 87% (w/w) high temperature silicone based resin; 7% to 17% (w/w) organic solvent; 1% to 5% (w/w) ceramic microsphere; and 1% to 5% (w/w) corrosion inhibitor, by weight of the second mixture.

A second embodiment relates to a silicon based coating composition comprising 45% to 55% (w/w), by weight of the total composition, of a first mixture containing: 60% to 70% (w/w) silazane; 12% to 22% (w/w) siloxane; 12% to 22% (w/w) silane, by weight of the first mixture; and 45% to 55%, by weight of the total composition, of a second mixture containing: 77% to 87% (w/w) high temperature silicone based resin; 7% to 17% (w/w) organic solvent; 1% to 5% (w/w) ceramic microsphere; and 1% to 5% (w/w) corrosion inhibitor, by weight of the second mixture.

A third embodiment relates to a silicon based coating composition comprising 85% to 95% (w/w), by weight of the total composition, of a first mixture containing: 60% to 70% (w/w) silazane; 12% to 22% (w/w) siloxane; 12% to 22% (w/w) silane, by weight of the first mixture; and 5% to 15% of a second mixture containing: 77% to 87% (w/w) high temperature silicone based resin; 7% to 17% (w/w) organic solvent; 1% to 5% (w/w) ceramic microsphere; and 1% to 5% (w/w) corrosion inhibitor, by weight of the second mixture.

A fourth embodiment relates to a silicon based coating composition comprising 5% to 15% (w/w), by weight of the total composition, of a first mixture containing: 60% to 70% (w/w) silazane; 12% to 22% (w/w) siloxane; 12% to 22% (w/w) silane, by weight of the first mixture; and 85% to 95% (w/w), by weight of the total composition, of a second mixture containing: 77% to 87% (w/w) high temperature silicone based resin; 7% to 17% (w/w) organic solvent; 1% to 5% (w/w) ceramic microsphere; and 1% to 5% (w/w) corrosion inhibitor, by weight of the second mixture.

A fifth embodiment relates a silicon based coating composition, comprising 23% to 33% (w/w), by weight of the total composition, of a first mixture containing: 60% to 70% (w/w) silazane, 12% to 22% (w/w) siloxane, 12% to 22% (w/w) silane, by weight of the first mixture; 46% to 66%

(w/w), by weight of the total composition, of a second mixture containing: 77% to 87% (w/w) high temperature silicone based resin, 7% to 17% (w/w) organic solvent, 1% to 5% (w/w) ceramic microsphere, and 1% to 5% (w/w) corrosion inhibitor; and 1% to 30% (w/w) mica pigments selected from the group consisting of mica group minerals, silica group minerals, and any combination thereof, by weight of the second mixture.

In addition, the present disclosure further provides a method of coating a surface, the method comprising mixing a mixture of constituents comprising: mixing a mixture of constituents to form a silicon based coating composition comprising: from about 1% (w/w) to about 80% (w/w) silazane, from about 1% (w/w) to about 30% (w/w) siloxane, from about 1% (w/w) to about 30% (w/w) silane, and from about 1% (w/w) to about 90% (w/w) high temperature silicone based resin; coating the mixture onto a surface; and curing the coating ambiently with or without additional heat.

Unless otherwise defined, all technical and scientific terms used herein have the same meaning as is commonly understood by one of skill in the art to which this disclosure belongs at the time of filing. If specifically defined, then the definition provided herein takes precedent over any dictionary or extrinsic definition. Further, unless otherwise required by context, singular terms shall include pluralities, and plural terms shall include the singular. Herein, the use of "or" means "and/or" unless stated otherwise. All patents and publications referred to herein are incorporated by reference.

DETAILED DESCRIPTION

Silicon based coating compositions formed from certain silicon-based polymers to make high performance coatings with desirable properties including high temperature and high heat resistance. As such, the top coatings provided by these compositions are clear, thin, hard, slick, having shortened curing process, and with resistance or high endurance to adverse conditions including, but not limited to, drag, scrub, friction, heat, moisture, high temperature, low temperature, UV exposure, ice build-up, microbial growth, corrosion, and the like. The compositions comprise polymerized silane and either or both of polymerized silazane and siloxane, and may further comprise one or more non-reactive organic solvents, and/or one or more additives for curing or for finishing, each of which in a proportion as designed herein to achieve certain properties. In addition, the present disclosure is based in part on the finding that compositions comprising a combination of various silicon-based polymers results in product providing better protections to exterior surfaces and underlying finish, and/or substrate in a wide range of applications.

The silicon-based coating compositions include polymerized silazane. "Silazane" and "polysilazane", as appearing in the specification and claims are generic terms intended to include compounds which contain one or more silicon-nitrogen bonds in which the nitrogen atom is bonded to at least two silicon atoms and may or may not contain cyclic units. Therefore, the terms "polysilazane" and "silazane polymer" include monomers, oligomers, cyclic, polycyclic, linear polymers or resinous polymers having at least one Si—N group in the compound, or having repeating units of $H_2Si$—NH, that is, $[H_2Si-NH]_n$, with "n" greater than 1. The chemical structure for polysilazane is shown below.

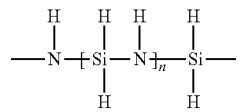

By "oligomer" is meant any molecule or chemical compound which comprises several repeat units, generally from about 2 to 10 repeat units. A simple example of silazane oligomer is disilazane $H_3Si$—NH—$SiH_3$. "Polymer", as used herein, means a molecule or compound which comprises a large number of repeat units, generally greater than about 10 repeat units. The oligomeric or polymeric silazanes may be amorphous or crystalline in nature. Polysilazane or a mixture of polysilazanes known in the art or commercially available include such products generally known among persons skilled in the art as: silazanes, disilazanes, polysilazanes, ureasilazanes, polyureasilazanes, aminosilanes, organosilazanes, organopolysilazanes, inorganic polysilazanes, and others employing liquid anhydrous ammonia in their production. One group of polysilazane, $[R_1R_2Si-NH]_n$, is isoelectronic with and close relatives to polysiloxane $[R_1R_2Si-O]_n$. A polysilazane with the general formula $(CH_3)_3Si$—NH—$[(CH_3)_2Si$—$NH]_n$—$Si(CH_3)_3$ is designated as polydimethylsilazane.

The making of polysilazane using ammonolysis procedure was disclosed in U.S. Pat. No. 6,329,487. In addition, polysilazane is also commercially available. For example, polysilazane (>99%) in tert-butyl acetate solvent manufactured by KiON Defense Technologies, Inc. (Huntingdon Valley, Pa.) as KDT Ambient Cure Coating Resin (KDT HTA® 1500) is supplied as a 100% solids liquid of low viscosity. KDT HTA® 1500 may comprise less than 5% cyclosilazane, a cyclic form of polysilazane. Similar product is also available from other manufacturers including AZ Electric Materials (Branchburg, N.J.).

Polysilazane comprises between about 0% and about 80% (w/w) of the total formula weight of silicon-based coating compositions. In one embodiment, the silicon-based coating composition does not contain polysilazane. In some embodiments, polysilazane (A-Resin, as designated herein) comprises about 80%, 75%, 70%, 65%, 60%, 55%, 50%, 45%, 40%, 35%, 30%, 25%, 20%, 15%, 10%, 5%, 4%, 3%, 2%, 1% (w/w), or any range thereof, of the silicon-based coating composition. For example, the amount of polysilazane present in the silicon based coating composition may range from between about 5% to about 10%, between about 8% to about 30%, between about 25% to about 40%, between about 35% to about 55%, between about 55% to about 70%, between about 60% to about 80%, (w/w) of the total composition, and ranges from between about 5% to about 7%, between about 7% to about 9%, between about 18% to about 20%, between about 34% to about 37%, between about 38% to about 42%, between about 45% to about 55%, between about 64% to about 68%, (w/w) of the total composition. In an exemplary embodiment, the amount of polysilazane present in the composition is 6% (w/w) of the total composition. In another exemplary embodiment, the amount of polysilazane present in the composition is 8% (w/w) of the total composition. In another exemplary embodiment, the amount of polysilazane present in the composition is 19% (w/w) of the total composition. In yet another exemplary embodiment, the amount of polysilazane present in the composition is 28% (w/w) of the total composition. In still another exemplary embodiment, the amount of polysilazane present in the composition is 36% (w/w) of the total composition. In yet another exemplary embodiment, the amount of polysilazane present in the composition is 40% (w/w) of the total composition. In still another exemplary embodiment, the amount of polysilazane present in the composition is 50% (w/w) of the total composition. In still another exemplary embodiment, the amount of polysilazane present in the composition is 66% (w/w) of the total composition.

The silicon-based coating compositions also include polymerized siloxane. A siloxane is a chemical compound having branched or unbranched backbones consisting of alternating silicon and oxygen atoms —Si—O—Si—O— with side chains R attached to the silicon atoms ($R_1R_2SiO$), where R is a hydrogen atom or a hydrocarbon group. Polymerized siloxanes, including oligomeric and polymeric siloxane units, with organic side chains (R≠H) are commonly known as polysiloxanes, or $[SiOR_1R_2]_n$, with "n" greater than 1. The chemical structure for polysiloxanes is shown below.

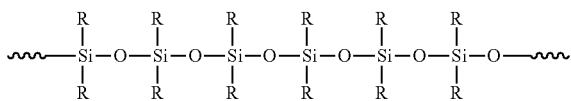

In addition to hydrogen, $R_1$ and $R_2$ of polysiloxane are independently selected from the group consisting of an alkyl, an alkenyl, a cycloalkyl, an alkylamino, aryl, aralkyl, or alkylsilyl. Thus, $R_1$ and $R_2$ can be such groups as methyl, ethyl, propyl, butyl, octyl, decyl, vinyl, allyl, butenyl, octenyl, decenyl, tetradecyl, hexadecyl, eicosyl, tetracosyl, cyclohexyl, methylcyclohexyl, methylamino, ethylamino, phenyl, tolyl, xylyl, naphthyl, benzyl, methylsilyl, ethylsilyl, propylsilyl, butylsilyl, octylsilyl, or decylsilyl. These alkyl, alkenyl, cycloalkyl, aryl, alkyl amino, aralkyl and alkylsilyl groups may each optionally be substituted by one or more substituents which contain heteroatoms, such as halides, like chlorine, bromine and iodine; alkoxy groups, like ethoxy, and also aryl groups, such as acetyl and propionyl. Organic side groups can be used to link two or more of these —Si—O— backbones together. By varying the —Si—O— chain lengths, side groups, and crosslinking, polysiloxanes can vary in consistency from liquid to gel to rubber to hard plastic. Representative examples of polysiloxane are $[SiO(CH_3)_2]_n$ (polydimethylsiloxane, PDMS) and $[SiO(C_6H_5)_2]_n$ (polydiphenylsiloxane). In an embodiment, the silicon-based coating composition comprises polydimethylsiloxane. The chemical structure for polydimethylsiloxane is shown below.

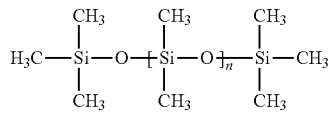

Octamethyltrisiloxane, $[(CH_3)_3SiO]_2Si(CH_3)_2$, is a linear siloxane in the polydimethylsiloxane family, with the INCI name as Trisiloxane. The chemical structure for Octamethyltrisiloxane is shown below.

Other methylated siloxanes include, but are not limited to: hexamethyldisiloxane, cyclotetrasiloxane, octamethylcyclotetrasiloxane, decamethyltetrasiloxane, decamethylcyclopentasiloxane. The method of producing high molecular weight polysiloxane product was disclosed in US. App. Pub. 20090253884. In addition, polysiloxane is also commercially available. As one example, polysiloxane, specifically, polydimethylsiloxane, is supplied in isopropyl acetate solvent by Genesee Polymers Corp. (Burton, Mich.), and it is sold as Dimethyl Silicone Fluids G-10 product. Polysiloxane (B-Resin, as designated herein) comprises between about 0% and about 30% (w/w) of the total formula weight of silicon-based coating compositions. In one embodiment, the silicon-based coating composition does not contain polysiloxane. In some embodiments, polysiloxane comprises about 30%, 27%, 25%, 23%, 20%, 17%, 15%, 13%, 10%, 7%, 5%, 4%, 3%, 2%, 1% (w/w), or any range thereof, of the silicon-based coating composition. For example, the amount of polysiloxane present in the silicon based coating composition may range from between about 5% to about 10%, between about 8% to about 22%, between about 20% to about 30%, (w/w) of the total composition, and ranges from between about 7% to about 9%, between about 12% to about 20%, between about 22% to about 28%, (w/w) of the total composition. In an exemplary embodiment, the amount of polysiloxane present in the composition is about 8% (w/w) of the total composition. In another exemplary embodiment, the amount of polysiloxane present in the composition is 15% (w/w) of the total composition. In another exemplary embodiment, the amount of polysiloxane present in the composition is 25% (w/w) of the total composition.

The silicon-based coating compositions may further include polymerized silane. Silanes are compounds which contain one or more silicon-silicon bonds. Polysilanes $[R_1R_2Si—R_1R_2Si]_n$ are a large family of inorganic polymers. The number of repeating units, "n", plays a role in determining the molecular weight and viscosity of the composition Like in polysiloxane, $R_1$ and $R_2$ are independently selected from the group consisting of a hydrogen, an alkyl, an alkenyl, a cycloalkyl, an alkylamino, aryl, aralkyl, or alkylsilyl. Thus, $R_1$ and $R_2$ can be such groups as methyl, ethyl, propyl, butyl, octyl, decyl, vinyl, allyl, butenyl, octenyl, decenyl, tetradecyl, hexadecyl, eicosyl, tetracosyl, cyclohexyl, methylcyclohexyl, methylamino, ethylamino, phenyl, tolyl, xylyl, naphthyl, benzyl, methylsilyl, ethylsilyl, propylsilyl, butylsilyl, octylsilyl, or decylsilyl. A polymer with the general formula $—[(CH_3)_2Si—(CH_3)_2Si]—_n$, is designated as polydimethylsilane. The chemical structure of polydimethylsilane is shown below.

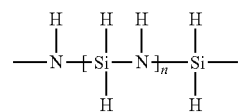

High molecular weight polysilane product with a narrow molecular weight distribution may be obtained by the process of U.S. Pat. No. 5,599,892. Polysilane is also available as a resin system supplied in amyl acetate blend from Kadko, Inc. (Beech Grove, Ind.), and it is sold as a KAD-KLAD R2X3™ product. Polysilane (C-Resin, as designated herein) comprises between about 0% and about 80% (w/w) of the total formula weight of silicon-based coating compositions. In one embodiment, the silicon-based coating composition does not contain polysilane. In some embodiments, polysilane comprises about 80%, 75%, 70%, 65%, 60%, 55%, 50%, 45%, 40%, 35%, 30%, 27%, 25%, 23%, 20%, 17%, 15%, 13%, 10%, 7%, 5%, 4%, 3%, 2%, 1% (w/w), or any range thereof, of the silicon-based coating composition. For example, the amount of polysilane present in the silicon-based coating composition may range from between about 60% to about 80%, between about 50% to about 65%, between about 30% to about 55%, between about 15% to about 35%, between about 8% to about 20%, (w/w) of the total composition, and ranges from between about 65% to about 78%, between about 60% to about 75%, between about 25% to about 32%, between about 22% to about 28%, between about 8% to about 12%, (w/w) of the total composition. In an exemplary embodiment, the amount of polysilane present in the composition is about 73% (w/w) of the total composition. In another exemplary embodiment, the amount of polysilane present in the composition is 67% (w/w) of the total composition. In another exemplary embodiment, the amount of polysilane present in the composition is 28% (w/w) of the total composition. In yet another exemplary embodiment, the amount of polysilane present in the composition is 25% (w/w) of the total composition. In yet another exemplary embodiment, the amount of polysilane present in the composition is 17% (w/w) of the total composition. In still another exemplary embodiment, the amount of polysilane present in the composition is 10% (w/w) of the total composition.

The silicon-based coating compositions may further include high temperature silicone-based resin. While silicone resins with long alkyl chains do not withstand high temperatures very well, silicon resins that are characterized by a branched framework of silicon atoms connected with each other by oxygen atoms possess special properties such as high heat and weathering resistance. Further, heat resistance can be markedly raised if the alkyl chains are replaced by phenyl or methyl groups, which results in extraordinarily heat resistant resins stable up to 660° F. High temperature silicon-based resins resistant to a range of temperatures are commercially available. For example, Hi-Temp™ coatings (Ti-Temp Coatings technology, Boxborough, Mass.), SILRES® silicone resin (Wacker Chemie AG, München, Germany), and Thurmalox® Resin (Dampney Company, Inc., Everett, Mass.) are some of the heat resistant products. Similar product is also available from other manufacturers.

High temperature silicone-based resin comprises between about 1% and about 90% (w/w) of the total formula weight of silicon-based coating compositions. In one embodiment, the silicon-based coating composition contains high temperature silicon-based resin. In some embodiments, high temperature silicon-based resin comprises about 90%, 85%, 80%, 75%, 70%, 65%, 60%, 55%, 50%, 45%, 40%, 35%, 30%, 25%, 20%, 15%, 10%, 5%, 4%, 3%, 2%, 1% (w/w), or any range thereof, of the silicon-based coating composition. For example, the amount of high temperature silicon based resin, present in the silicon based coating composition may range from between about 5% to about 10%, between about 8% to about 30%, between about 25% to about 40%, between about 35% to about 55%, between about 50% to about 70%, between about 60% to about 80%, between about 75% to about 90% (w/w) of the total composition, and ranges from between about 5% to about 15%, between about 15% to about 30%, between about 30% to about 45%, between about 45% to about 60%, between about 60% to about 80%, between about 80% to about 90%, (w/w) of the total composition. In an exemplary embodiment, the amount of high temperature silicon-based resin present in the composition is about 74% (w/w) of the total composition. In another exemplary embodiment, the amount of high temperature silicon-based resin present in the composition is about 55% (w/w) of the total composition. In another exemplary embodiment, the amount of high temperature silicon-based resin present in the composition is about 41% (w/w) of the total composition. In yet another exemplary embodiment, the amount of high temperature silicon-based resin present in the composition is about 27% (w/w) of the total composition. In still another exemplary embodiment, the amount of high temperature silicon-based resin present in the composition is about 8% (w/w) of the total composition.

The silicon-based coating compositions may additionally include one or more organic solvents. Generally, the organic solvent is defined as a carbon-containing chemical that is capable of dissolving a solid, liquid, or a gas. Although one skilled in the art will appreciate that a wide variety of solvents may be incorporated, suitable solvents are those that contain no water and no reactive groups such as hydroxyl or amine groups. These solvents include, but not limited to, for example, aromatic hydrocarbons; aliphatic hydrocarbons, such as, hexane, heptane, benzene, toluene, branched-chain alkanes (isoparaffins); halogenated hydrocarbons; esters, such as methyl acetate, n-butyl acetate, tert-butyl acetate, isobutyl acetate, sec-butyl acetate, ethyl acetate, amyl acetate, pentyl acetate, 2-methyl butyl acetate, isoamyl acetate, n-propyl acetate, isopropyl acetate, ethylhexyl acetate; ketones, such as acetone or methyl ethyl ketone; ethers, such as tetrahydrofuran, dibutyl ether; and mono- and polyalkylene glycol dialkyl ethers (glymes) or mixtures of these solvents may be used. In an embodiment, the organic solvent comprises n-butyl acetate. In another embodiment, the organic solvent comprises tert-butyl acetate. In yet another embodiment, the organic solvent comprises isoparaffins.

In addition, the organic solvent generally comprises between about 0% to about 70% (w/w) of the silicon-based coating composition. In some embodiments, the organic solvent comprises about 70%, about 65%, about 60%, about 55%, about 50%, about 45%, about 40%, about 35%, about 30%, about 25%, about 20%, about 15%, about 10%, about 5%, or about 0% (w/w) of the total composition. For example, the amount of organic solvent present in the silicon-based coating composition ranges from between about 0% to about 35% (w/w) of the composition. In another embodiment, the amount of organic solvent in the silicon-based coating composition ranges from between about 10% to about 45% (w/w) of the total composition. In another embodiment, the amount of organic solvent in the silicon-based coating composition ranges from between about 10% to about 35% (w/w) of the total composition. In an additional embodiment, the amount of organic solvent in the silicon-based coating composition ranges from between about 20% to 55% (w/w) of the total composition. In still another embodiment, the amount of organic solvent in the silicon-based coating composition ranges from between about 25% to 45% (w/w).

The silicon based coating compositions may further include one or more additives, including, but not limited to curing agents, matting agents, pigments, fillers, flow control agents, dry flow additives, anti-cratering agents, surfactants, texturing agents, light stabilizers, matting agents, photosensitizers, wetting agents, anti-oxidants, plasticizers, opacifiers, stabilizers, degassing agents, corrosion inhibitors, ceramic microspheres, slip agents, dispersing agents, mica pigments, and surface altering additives.

Among various coating composition additives that may be optionally added, substances or mixtures of substances added to a polymer composition to promote or control the curing reaction are curing agents, which include catalyst and hardener. As generally known, curing catalyst increases the rate of a chemical reaction as an initiator. It is added in a small quantity as compared to the amounts of primary reactants and does not become a component part of the chain. Curing hardener, often an amine, enables the formation of a complex three-dimensional molecular structure by chemical reaction between the polymers and the amine. It is essential that the correct mix ratio is obtained between resin and hardener to ensure that a complete reaction takes place, such that no unreacted resin or hardener will remain within the matrix to affect the final properties after cure. Conventional polyamine hardeners comprise primary or secondary amine groups. A polysilazane-modified polyamine hardener was described in U.S. Pat. No. 6,756,469, providing heated polyamine in the presence of a polysilazane to prepare a hardener imparting enhanced high temperature properties, higher char yields and better adhesion properties. In some embodiments, neither catalyst nor hardener is needed for a curing process that is initiated via solvent condensation. In some embodiments, each polymer in the composition is capable of curing independently of the other without the need of forming co-polymers.

The matting agents typically can alter the surface of a coating in such a way that the light falling on it is scattered in a defined fashion. The matting agent particles stand out from the coating but are invisible to the human eye. The color of the coating is not affected to any great extent. Representative examples of such matting agents include inorganic matting agents such as silica-based ACEMATT® matting agents from Evonik Degussa (Parsippany, N.J.) and silica-based matting agents available from Ineos Silicas (Hampshire, United Kingdom). The matting agents may vary in size and include materials that are micron sized particles. For example, the particles may have an average diameter of from about 0.1 to 1000 microns, and in one embodiment from 0.1 to 100 microns. Combinations of matting agents may be used.

The pigments may be of any color or combination of colors, as well as employed in any pattern or combination of patterns. The pigments used herein are typically inorganic materials. Inorganic pigments can be crystals of metal oxides. This structure is extremely stable, and sets it apart from organic pigments, which are generally composed of carbon, oxygen, and nitrogen. Such pigments include mixed metal oxides that include more than one type of metal atom along with the oxygen to make the pigment. In general, pigments are produced by the high temperature calcination of high grade metal oxides in a kiln according to given time and temperature profiles. The resulting mixed metal oxide can be milled using a variety of high-energy techniques in order to reduce the particle size. The pigments used herein are typically stable at high temperatures. Representative examples of such pigments include black and gray inorganic pigments, such as the camouflage inorganic pigment packages from Shepherd Color (West Chester, Ohio). The camouflage pigment CM2581 available from Shepherd Color contains a mixture of chromic oxide (2-8%), copper chromite black spinel (20-30%), titanium dioxide (50-70%), zinc iron chromate black spinel (10-15%). Combinations of pigments may be used as needed.

In one exemplary embodiment, a mica pigment is included in the composition. Mica pigments are available in a wide variety of colors. Mica pigments have a variety of positive benefits such as, added corrosion protection, added thermal insulation values, high temperature color pigmentation, visual enhancement resulted from metallic hues and tones. In one embodiment, the mica pigment is natural or synthetic mica group minerals. In another embodiment, the mica pigment is natural or synthetic silica group minerals. In yet another embodiment, the composition comprises a mixture of mica group minerals and silica group minerals. The mica pigment generally comprises between about 1% to about 30% (w/w) of the silicon-based coating composition. In some embodiments, the mica pigment comprises about 30%, about 25%, about 20%, about 15%, about 10%, about 5%, or about 1% (w/w) of the total composition.

Other materials may be included in the composition, including but not limited to flow and leveling agents such as available from BYK (Wesel, Germany), hydrophobic fumed silica such as available from Evonik Degussa (Parsippany, N.J.), alumina fibers and silicon carbide fibers such as available from Sigma Aldrich (St. Louis, Mo.), and the like. Ceramic microspheres such as available from Zeospheres™ G-600 (Lockport, La.), and the like. Corrosion inhibitor such as available from Halox® 430 (Hammond, Ind.), and the like.

In addition, the coating composition additives typically comprise less than about 30% of the total silicon-based coating composition. In some embodiments, the additive comprises about 30%, about 25%, about 20%, about 15%, about 10%, about 9%, 8%, 7%, 6%, 5%, 4%, 3%, 2%, 1%, 0.1%, or 0% (w/w) of the total composition.

The coating composition may be applied by dipping, spraying, brushing, painting, wiping, immersion, or spin-coating techniques. These procedures will typically provide polymer coatings of thicknesses on the order of 1 micrometer or even thinner, to up to about 75 microns (or micrometers, μm) per coat for the cured polymers. If a thicker coating is desired, multiple coating layers may be provided. The clear coat formulations as provided herein result in a coating transparent and therefore do not affect the optical appearance of the substrate. Due to the small coating thickness, only a very small amount of material is required, which is advantageous both in terms of cost and also ecologically, and the weight change of the substrate to be coated is nearly unnoticeable. The coat thickness of the silicon-based coating as provided herein following evaporation of the solvent and curing is in the range from about 0.1 to about 50 microns, from about 0.5 to about 40 microns, or from about 1 to about 25 microns.

Curing is the process of polymerization after the coating is applied. Curing process can be controlled through temperature, air flow, ratio of the solvents, choice of resin and hardener compounds, and the ratio of said compounds. The curing process can take minutes to hours. Some formulations benefit from heating during the cure period, whereas others simply require time and ambient temperatures. Coatings may be ambiently cured at room temperature ranging from 5-40° C. By providing slight amount of heat the curing time can be shortened. Curing is performed at temperatures not exceeding about 100° C. These curing atmospheres include, but are not limited to, air and other non-reactive or reactive gaseous environments which contain moisture, inert gases like nitrogen and argon, and reactive gases such as ammonia, hydrogen, carbon monoxide, and so on. Rapid cure times are achieved using this method when the applied coatings are exposed to the moisture-containing atmosphere at room temperature, and the cure can be further accelerated with adding heat by using an oven or infrared system.

Coating related testing provides quality control and product description based on industrial standards. Typical coating tests may include, but not limited to, thickness test, coefficient of friction test, hardness test, scratch resistance test, testing the amount of force needed to scratch the coating from substrate; 90 degree peel from topcoat test; 90 degree peel from adhesive test; cross-hatch adhesion test; UV endurance test; heat stability test; conical bend test, impact direct and indirect test. In particular, thickness test, measuring the thickness of substrates and top-coated materials, may be carried out using test panels on which uniform films are produced by a coating suitable for spraying; using micrometers for dried films; using magnetic gauges for nonmagnetic coatings; using Wet Film Thickness Gauge or Pfund Gauge for wet film thickness; or using microscopic observation of precision angular cuts in the coating film. Hardness test of organic materials may be carried out using indentation hardness measurements, Sward-type hardness rocker instruments, or pendulum damping testers. In addition, the "kinetic coefficient of friction" (COF, μ), also known as a "frictional coefficient" or "friction coefficient," describes the ratio of the force of friction between two bodies and the force pressing them together. Coefficients of friction range from near zero to greater than one. Rougher surfaces tend to have higher effective values. The COF measured under ASTM D1894 is called Standard COF. More standard ASTM (American Society for Testing and Materials) test methods for coatings are available at the World Wide Web wernerblank.com/polyur/testmethods/coating_test.htm. In one embodiment, the thickness of the silicon-based coating resulted from the compositions provided herein is between from about 1 micron to about 45 microns. In one embodiment, the hardness of the silicon-based coating resulted from the compositions provided herein ranges from about 4H to about 9H, using ASTM D3363. Further, in one embodiment, the COF of the silicon-based coating resulted from the compositions provided herein is between from about 0.03 to about 0.04.

Surfaces, substrates and substrate layers suitable for coating compositions provided herein may comprise any desirable substantially solid material that vary widely. For example, the type of surfaces that can be treated with the compositions includes glass; fiberglass; carbon fiber composites; basalt fiber composites; siloxane and ceramic fibers; ceramics, such as, silicon nitride, silicon carbide, silica, alumina, zirconia, and the like; metals, such as, for example, iron, stainless steel, galvanized steel, zinc, aluminum, nickel, copper, magnesium and alloys thereof, silver and gold and the like; plastics, such as, polymethyl methacrylate, polyurethane, polycarbonate, polyesters including polyethylene terephthalate, polyimides, polyamides, epoxy resins, ABS polymer, polyethylene, polypropylene, polyoxymethylene; porous mineral materials, such as, concrete, clay bricks, marble, basalt, asphalt, loam, terracotta; organic materials, such as wood, leather, parchment, paper and textiles; and coated surfaces, such as, plastics emulsion paints, acrylic coatings, epoxy coatings, melamine resins, polyurethane resins and alkyd coatings. The surface or substrate contemplated herein may also comprise at least two layers of materials. One layer of material, for example, may include glass, metal, ceramic, plastics, wood or composite material. Other layers of material comprising the surface or substrate may include layers of polymers, monomers, organic compounds, inorganic compounds, organometallic compounds, continuous layers and nanoporous layers.

Further, the surfaces and substrates may have different shapes, e.g., substrates having flat, planar surfaces, molded articles having curved surfaces, fibers, fabrics, and the like. It will be appreciated by those skilled in the art that the foregoing lists are merely illustrative of various materials which may be coated using the presently disclosed compositions and methods and are not in any way limiting of the different substrates with which the present disclosure is useful. Insofar as they protect virtually any type of substrate from oxidative thermal degradation, corrosion, or chemical attack. The coatings may also be used to strengthen relatively flaw sensitive brittle substrates such as glass and non-wetting surfaces. The coatings may additionally be useful to provide bonding or compatibility interfaces between different types of materials.

A particularly advantageous, but non-limiting, use of this coating is as a coating on automobile, aircraft, missiles, aerospace components, marine vessels, wheels, wind generation equipment and blades, engine shrouds, car exhausts, smoke stacks, industrial kilns, combustion chambers, industrial duct and pipe systems, solar panels, electronic components, fire and safety appliance, insulation and energy systems, building surfaces, public spaces, packaging surfaces, outdoor signs and advertisement billboard or LED screens. Those surfaces are exposed to UV, heat, coldness, moisture, ice build-up, chemical corrosion, and wear and tear from natural physical forces creating friction such as, water, air flow and dust. In addition, such protection is particularly suitable for mechanical components exposed to high temperatures, including, for example, exterior aircraft surfaces, a wing slat or pylon made of titanium, aluminum or cress metal heat shields on an aircraft or other coated aircraft areas subject to engine efflux. A protective film provided by the silicon-based coating compositions disclosed herein over the base layer of paint or surface material of these surfaces is particularly useful to protect the surface and the substrate material from various external forces, particularly from the heat and high temperature, by greatly reducing radiant heat passing through the surface and the substrate material.

Although the disclosure described herein is susceptible to various modifications and alternative iterations, specific embodiments thereof have been described in greater detail above. It should be understood, however, that the detailed description of the composition is not intended to limit the disclosure to the specific embodiments disclosed. Rather, it should be understood that the disclosure is intended to cover all modifications, equivalents, and alternatives falling within the spirit and scope of the disclosure as defined by the claim language.

DEFINITIONS

As used herein, the terms "about" and "approximately" designate that a value is within a statistically meaningful range. Such a range can be typically within 20%, more typically still within 10%, and even more typically within 5% of a given value or range. The allowable variation encompassed by the terms "about" and "approximately" depends on the particular system under study and can be readily appreciated by one of ordinary skill in the art.

As used herein, the term "w/w" designates the phrase "by weight" and is used to describe the concentration of a particular substance in a mixture or solution.

As used herein, the term "ml/kg" designates milliliters of composition per kilogram of formula weight.

As used herein, the term "cure" or "curing" refers to a change in state, condition, and/or structure in a material that is usually, but not necessarily, induced by at least one variable, such as time, temperature, moisture, radiation, presence and quantity in such material of a catalyst or accelerator or the like. The terms cover partial as well as complete curing As used herein, the term "hardness" or "H" designates the property of a material that enables it to resist plastic deformation, usually by penetration. However, the term hardness may also refer to resistance to bending, scratching, abrasion or cutting. The usual method to achieve a hardness value is to measure the depth or area of an indentation left by an indenter of a specific shape, with a specific force applied for a specific time. There are four principal standard test methods for expressing the relationship between hardness and the size of the impression, these being Pencil Hardness ASTM D3363, Brinell, Vickers, and Rockwell. For practical and calibration reasons, each of these methods is divided into a range of scales, defined by a combination of applied load and indenter geometry.

As used herein, the term "coefficient of friction" (COF), also known as a 'frictional coefficient' or 'friction coefficient' or "kinetic coefficient of friction" and is an empirical measurement which describes the ratio of the force of friction between two bodies and the force pressing them together. The coefficient of friction depends on the materials used. When the coefficient of friction is measured by a standardized surface, the measurement is called "standardized coefficient of friction."

As used herein, the term "corrosion resistant agent" or variation thereof refers to additives in the coating on a surface which inhibit the corrosion of the surface substrate when it is exposed to air, heat, or corrosive environments for prolonged time periods.

As used herein, the term "monomer" refers to any chemical compound that is capable of forming a covalent bond with itself or a chemically different compound in a repetitive manner. The repetitive bond formation between monomers may lead to a linear, branched, super-branched, or three-dimensional product. Furthermore, monomers may themselves comprise repetitive building blocks, and when polymerized the polymers formed from such monomers are then termed "block polymers". Monomers may belong to various chemical classes of molecules including organic, organometallic or inorganic molecules. The molecular weight of monomers may vary greatly between about 40 Dalton and 20000 Dalton. However, especially when monomers comprise repetitive building blocks, monomers may have even higher molecular weights. Monomers may also include additional reactive groups.

Contemplated polymers may also comprise a wide range of functional or structural moieties, including aromatic systems, and halogenated groups. Furthermore, appropriate polymers may have many configurations, including a homopolymer, and a heteropolymer. Moreover, alternative polymers may have various forms, such as linear, branched, super-branched, or three-dimensional. The molecular weight of contemplated polymers spans a wide range, typically between 400 Dalton and 400000 Dalton or more.

The following examples are intended to further illustrate and explain the present disclosure. The disclosure, therefore, should not be limited to any of the details in these examples.

EXAMPLES

Example 1

Preparation of Resin Systems for Making Silicon Based Coating Compositions

The silicon-based coating formulations provided herein were formed from two or more different resin systems chosen from, what was known as A-Resin, B-Resin, C-Resin, and any combinations thereof. The A-Resin was made according to the formulation provided in Table 1. The A-Resin was purchased from KiON Defense Technologies (Huntingdon Valley, Pa.), and it was sold as KDT HTA 1500 Fast™, an air curable liquid polysiloxazane based coating resin (8.9 lbs/Gallon).

TABLE 1

A-Resin formulation

| Ingredient | CAS No. | Amount (w/w) Appx. |
|---|---|---|
| Polysilazane |  | >99% (w/w) |
| Cyclosilazane | CAS# 503590-70-3 | <5% (w/w) |
| n-Butyl Acetate | CAS# 123-86-4 | <3% (w/w) |
| (or tert-Butyl Acetate) | (CAS# 540-88-5) |  |

The B-Resin was made according to the formulation provided in Table 2. The B-Resin was purchased from Genesee Polymers Corp. (Burton, Mich.), and it was sold as Dimethyl Silicone Fluids G-10 products (8.0 lbs/Gallon).

TABLE 2

B-Resin formulation

| Ingredient | CAS No. | Amount (w/w) Appx. |
|---|---|---|
| Polydimethylsiloxane Fluid | CAS# 63148-62-9 | <5% (w/w) |
| Isopropyl Acetate Solvent | CAS# 108-24-4 | <98% (w/w) |

The C-Resin was made according to the formulation provided in Table 3. The C-Resins was purchased from Kadko, Inc. (Beech Grove, Ind.), and it was sold as a polysilazane based KADKLAD R2X3™ product.

TABLE 3

C-Resin formulation

| Ingredient | CAS No. | Amount (w/w) Appx. |
|---|---|---|
| Polysilane |  | <8% (w/w) |
| Amyl Acetate Blend | CAS# 628-63-7 | <98% |
| Isopropyl Acetate | CAS# 108-21-4 | 25-35% |
| Isoparaffinic Hydrocarbon | CAS# 64741-66-8 | 50-60% |
| Aliphatic Hydrocarbon | CAS# 64742-47-8 | 5-10% |
| Acetate Ester | CAS# 108419-34-7 | 1-5% |

The A-, B-, and C-Resin systems were then used in appropriate amount for different clear coat formulations, as such a mix of polysilazane, polysiloxane and/or polysilane and acetate solvent was used to produce formulations of coating products with various desired properties as described below.

Characteristics of the coating products using the formulations provided herein included clear, thin, light, slick, hard, heat resistant, high temperature resistant, ice build-up resistant, UV resistant, chemical resistant, and microbial resistant.

Example 2

Thermal Barrier Coat Formulation Part A

A thermal barrier coat silicon-based coating formulation Part A was made according to the formulation provided in Table 4. The Part A composition of the thermal barrier coat was formed by mixing a number of ingredients in the amount listed below. The formulation was to be mixed with thermal barrier coat Part B, resulting a mixture ready to coat a face of a top.

TABLE 4

Thermal Barrier Coat Formulation Part A Composition

| INGREDIENT | | AMOUNT (w/w) |
|---|---|---|
| 1. Base Resin | | |
| Thurmalox Resin | | 82% (w/w) |
| 2. Solvent | | |
| Isoparaffin (Isopar™-G) | CAS# 64742-48-9 | 6% (w/w) |
| tert-Butyl Acetate | CAS# 540-88-5 | 6% (w/w) |
| 3. Additives | | |
| Ceramic Microspheres | | 3% (w/w) |
| Corrosion inhibitor | | 3% (w/w) |
| | | Total = 100% (w/w) |

To blend the ingredients and make 10 gallons of thermal barrier coat formulation Part A, each component was measured out to the appropriate percentage of the formula needed to create the coating. Each of ingredients was pre-weighed: 82% by formula weight of 10 gallons Thurmalox® Resin (Everett, Mass.), 7% by formula weight of 10 gallons isoparaffin, 6% by formula weight of 10 gallons tert-butyl acetate, 3% by formula weight of 10 gallons Ceramic Microspheres, such as, Zeospheres® G-600 (Lockport, La.), and 3% by formula weight of 10 gallons corrosion inhibitor, such as Halox® 430 (Hammond, Ind.). In this particular example, Thurmalox® 270-20 Black was used for the finished color. Isoparaffin was added to adjust drying time of finished formula. The ceramic microspheres were used to accommodate the end use and properties for a thermal barrier coat.

The thermal barrier coat formulation Part A mixture was first made by mixing Thurmalox® Resin, isoparaffin and the corrosion inhibitor to form a mixture. Each of these components was blended by hand with a stir stick and a high-speed disperser at approximately 8500 rpm for approximately five (5) minutes, or until the blend was thoroughly and uniformly mixed. The measured amount of ceramic microsphere was then added and stirred into the mixture with a stir paddle until a homogenous or uniform blend was formed without breaking or crushing the microspheres. The stir paddle was rotated at about 500 rpm, and the mixing took approximately five (5) minutes. The finished formulated Part A composition was then filtered through a 120-mesh paint filter (U.S. standard sieve size, same below) such that there were no particles or debris left within the mixture. This filtered Part A composition was then placed into a container and sealed tightly to prevent the escape of solvents.

Example 3

Thermal Barrier Coat Formulation Part B

A thermal barrier coat silicon-based coating formulation was made according to the formulation provided in Table 5. The base resin mixture of this particular clear coat was formed by mixing the A-, B- and C-Resins in the amount listed below. The formulation was to be used to coat the face of a metal surface.

TABLE 5

Thermal Barrier Coat Formulation Part B Composition

| INGREDIENT | | AMOUNT (w/w) |
|---|---|---|
| 1. Base Resin Mixture | | |
| A-Resin: | | 66% (w/w) |
| B-Resin: | | 17% (w/w) |
| C-Resin: | | 17% (w/w) |
| 2. Solvent | | |
| tert-Butyl Acetate | CAS# 540-88-5 | 0% (w/w) |
| High-purity Synthetic Isoparaffin (Isopar™-G) | | 0% (w/w) |
| 3. Additives | | |
| Matting Agents | | <2% (w/w) |
| Texturing Agents | | <2% (w/w) |
| | | Total = 100% (w/w) |

To blend the ingredients and make 10 gallons of thermal barrier coat composition Part B, the B-Resin and C-Resin needed to be blended together first. To blend these two resins, the B-Resin and C-Resin were agitated prior to blending. After agitation, 17% by formula weight of 10 gallons B-Resin, 17% by formula weight of 10 gallons C-Resin were weighed out, and then blended using a mix paddle for a few minutes to obtain a uniform mixture. Since both the B- and C-Resin were very fluid in nature, no extreme agitation was required.

The other ingredient was then weighed out: 66% by formula weight of 10 gallons A-Resin. The base resin mixture was made by mixing 66% by formula weight of 10 gallons A-resin with B- and C-Resin blend. When the ingredients were mixed into and within one mixture, the mixture was thoroughly mixed by stir paddle until a homogenous or uniform blend was formed. The stir paddle was rotated at about 500 rpm, and the mixing took approximately five (5) minutes. The finished formulated resin system was then filtered through a 120-mesh paint filter (U.S. standard sieve size, same below) such that there were no particles or debris left within the coating mixture. This filtered Part B composition was then placed into a container and sealed tightly to prevent the escape of solvents.

Example 4

Thermal Barrier Coat Formulation MX 490-50%

A thermal barrier silicon-based coating formulation was made according to the formulation provided in Table 6. The base resin mixture of this particular clear coat was formed by mixing the Part A and Part B resin mixtures in the amount listed below. The formulation was to be used to coat the face of a painted surface.

TABLE 6

Thermal Barrier Coat Formulation MX 490-50% Composition

| INGREDIENT | AMOUNT (w/w) |
|---|---|
| Part A: | 50% (w/w) |
| Part B: | 50% (w/w) |
| | Total = 100% (w/w) |

To blend the ingredients and make 10 gallons of thermal barrier coat MX 490-50% coating composition, the Part A and Part B compositions needed to be blended together first. To blend these two compositions, the Part A composition and Part B composition were agitated prior to blending. After agitation, 50% by formula weight of 10 gallons Part A composition, and 50% by formula weight of 10 gallons Part B composition were weighed out, and then blended using a mix paddle for a few minutes to obtain a uniform mixture. The mixing paddle was rotated at about 500 rpm, and the mixing took approximately 3-5 minutes.

The finished formulated resin system was then spray coated onto a glass panel. The coating had a thickness of about 0.5 mil to 1.0 mil (1 mil=0.001 inches or 25.4 µm). The theoretical coverage of this formulation is 1200 sq/ft per gal for a thickness of 1 mil. Pre-conditioning of the substrate surface can be but not limited to dry, clean and contamination free surface.

After application, the coating was allowed to cure ambiently at room temperature for 2 hours, it then became dry to touch achieving approximately 25% of cured film property values. An additional allowance of 5 days resulted in a finished clear coating with full property values. With heating temperature up to 350° F., the coating was cured for about an hour.

The coating was then tested in accordance with ASTM E1530 test standards for heat stability resulting in a thermal barrier coating with a heat resistance above 1600° F.; with ASTM D3363 test standards for hardness resulting in a thermal barrier coating with a hardness of 7H and higher; with ASTM D4587-01 test standards for Q-UV resulting in a thermal barrier coating exhibiting no visual degradation of surface after 3000 hours of exposure; with ASTM B117-03 test standards for Q-FOG resulting in a thermal barrier coating resistant to any undercutting of the coating from the substrate and/or no signs of blistering after 4000 hours of exposure; with ASTM D3359-02 test standards for Adhesion resulting in a thermal barrier coating with no visual removal of the coating at or along the cross hatch scores, resulting a value at 5B.

Example 5

Thermal Barrier Coat Formulation MX 490-10%

A thermal barrier silicon-based coating formulation was made according to the formulation provided in Table 7. The base resin mixture of this particular clear coat was formed by mixing the Part A and Part B resin mixtures in the amount listed below. The formulation was to be used to coat the face of a painted surface.

TABLE 7

Thermal Barrier Coat Formulation MX 490-10% Composition

| INGREDIENT | AMOUNT (w/w) |
|---|---|
| Part A: | 10% (w/w) |
| Part B: | 90% (w/w) |
| | Total = 100% (w/w) |

To blend the ingredients and make 10 gallons of thermal barrier coat MX 490-10% coating composition, the Part A and Part B compositions needed to be blended together first. To blend these two compositions, the Part A composition and Part B composition were agitated prior to blending. After agitation, 10% by formula weight of 10 gallons Part A composition, and 90% by formula weight of 10 gallons Part B composition were weighed out, and then blended using a mix paddle for a few minutes to obtain a uniform mixture. The mixing paddle was rotated at about 500 rpm, and the mixing took approximately 3-5 minutes.

The finished formulated resin system was then spray coated onto a glass panel. The coating had a thickness of about 0.75 mil to 1.0 mil (1 mil=0.001 inches or 25.4 µm). The theoretical coverage of this formulation is 1200 sq/ft per gal for a thickness of 1 mil. Pre-conditioning of the substrate surface can be but not limited to dry, clean and contamination free surface.

After application, the coating was allowed to cure ambiently at room temperature for 2 hours, it then became dry to touch achieving approximately 25% of cured film property values. An additional allowance of 5 days resulted in a finished clear coating with full property values. With heating temperature up to 350° F., the coating was cured for about an hour.

The coating was then tested in accordance with ASTM E1530 test standards for heat stability resulting in a thermal barrier coating with a heat resistance above 1600° F.; with ASTM D3363 test standards for hardness resulting in a thermal barrier coating with a hardness of 5H and higher; with ASTM D4587-01 test standards for Q-UV resulting in a thermal barrier coating exhibiting no visual degradation of surface after 3000 hours of exposure; with ASTM B117-03 test standards for Q-FOG resulting in a thermal barrier coating resistant to any undercutting of the coating from the substrate and/or no signs of blistering after 4000 hours of exposure; with ASTM D3359-02 test standards for Adhesion resulting in a thermal barrier coating with no visual removal of the coating at or along the cross hatch scores, resulting a value at 5B.

Example 6

Thermal Barrier Coat Formulation MX 490-90%

A thermal barrier silicon-based coating formulation was made according to the formulation provided in Table 8. The base resin mixture of this particular clear coat was formed by mixing the Part A and Part B resin mixtures in the amount listed below. The formulation was to be used to coat the face of a painted surface.

TABLE 8

Thermal Barrier Coat Formulation MX 490-90% Composition

| INGREDIENT | AMOUNT (w/w) |
|---|---|
| Part A: | 90% (w/w) |
| Part B: | 10% (w/w) |
| | Total = 100% (w/w) |

To blend the ingredients and make 10 gallons of thermal barrier coat MX 490-90% coating composition, the Part A and Part B compositions needed to be blended together first. To blend these two compositions, the Part A composition and Part B composition were agitated prior to blending. After agitation, 90% by formula weight of 10 gallons Part A composition, and 10% by formula weight of 10 gallons Part B composition were weighed out, and then blended using a mix paddle for a few minutes to obtain a uniform mixture. The mixing paddle was rotated at about 500 rpm, and the mixing took approximately 3-5 minutes.

The finished formulated resin system was then spray coated onto a glass panel. The coating had a thickness of about 0.75 mil to 1.0 mil (1 mil=0.001 inches or 25.4 µm).

The theoretical coverage of this formulation is 1200 sq/ft per gal for a thickness of 1 mil. Pre-conditioning of the substrate surface can be but not limited to dry, clean and contamination free surface.

After application, the coating was allowed to cure ambiently at room temperature for 2 hours, it then became dry to touch achieving approximately 25% of cured film property values. An additional allowance of 5 days resulted in a finished clear coating with full property values. With heating temperature up to 350° F., the coating was cured for about an hour.

The coating was then tested in accordance with ASTM E1530 test standards for heat stability resulting in a thermal barrier coating with a heat resistance above 1600° F.; with ASTM D3363 test standards for hardness resulting in a thermal barrier coating with a hardness of 5H and higher; with ASTM D4587-01 test standards for Q-UV resulting in a thermal barrier coating exhibiting no visual degradation of surface after 3000 hours of exposure; with ASTM B117-03 test standards for Q-FOG resulting in a thermal barrier coating resistant to any undercutting of the coating from the substrate and/or no signs of blistering after 4000 hours of exposure; with ASTM D3359-02 test standards for Adhesion resulting in a thermal barrier coating with no visual removal of the coating at or along the cross hatch scores, resulting a value at 5B.

Example 7

Thermal Barrier Coat Formulation MX 6286

A thermal barrier silicon-based coating formulation was made according to the formulation provided in Table 9. The base resin mixture of this particular clear coat was formed by mixing the Part A, Part B resin mixtures and mica pigments in the amount listed below. The formulation was to be used to coat the face of a painted surface.

TABLE 9

Thermal Barrier Coat Formulation MX 6286 Composition

| INGREDIENT | AMOUNT (w/w) |
|---|---|
| Mixed Resin | |
| Part A: | 66.5% (w/w) |
| Part B: | 33.5% (w/w) |
| | Total = 100% (w/w) |
| | 70%-99% (w/w) |
| Additives | |
| Mica Pigments | |
| Silica Group Minerals CAS# 64060-48-6 | |
| Mica Group Minerals CAS# 12001-26-2 | |
| | 1-30% (w/w) |
| | Total = 100% (w/w) |

To blend the ingredients and make 10 gallons of thermal barrier coat MX 6286 coating composition, the Part A and Part B compositions were blended together first. To blend these two compositions, the Part A composition and Part B composition were agitated prior to blending. After agitation, 66.5% by formula weight of 10 gallons Part A composition, and 33.5% by formula weight of 10 gallons Part B composition were weighed out, and then blended using a mix paddle for a few minutes to obtain a uniform mixture. The mixing paddle was rotated at about 500 rpm, and the mixing took approximately 3-5 minutes. Then 90% mixed resin (Part A and Part B in 2:1) by formula weight of 10-gallon final finished formula was weighted out. 10% Mica pigment by formula weight of 10-gallon final finished formula, either using the silica group minerals or mica group minerals, was weighted out and mixed into the 2:1 Part A and B mixed resin. The mixing paddle was rotated at about 500 rpm, and the mixing took approximately 3-5 minutes to form uniform final formula of MX 6286.

The finished formulated resin system was then spray coated onto a glass panel. The coating had a thickness of about 0.75 mil to 1.0 mil (1 mil=0.001 inches or 25.4 μm). The theoretical coverage of this formulation is 1200 sq/ft per gal for a thickness of 1 mil. Pre-conditioning of the substrate surface can be, but not limited to, dry, clean and a contamination free surface.

After application, the coating was allowed to ambient-cure at room temperature for 2 hours, it then became dry to touch achieving approximately 25% of cured film property values. An additional allowance of 5 days resulted in a finished clear coating with full property values. With heating temperature up to 350° F., the coating was cured for about an hour.

The coating was then tested in accordance with ASTM E1530 test standards for heat stability resulting in a thermal barrier coating with a heat resistance above 1600° F.; with ASTM D3363 test standards for hardness resulting in a thermal barrier coating with a hardness of 5-7H; with ASTM D4587-01 test standards for Q-UV resulting in a thermal barrier coating exhibiting no visual degradation of surface after 3000 hours of exposure; with ASTM B117-03 test standards for Q-FOG resulting in a thermal barrier coating resistant to any undercutting of the coating from the substrate and/or no signs of blistering after 4000 hours of exposure; with ASTM D3359-02 test standards for Adhesion resulting in a thermal barrier coating with no visual removal of the coating at or along the cross hatch scores, resulting a value at 5B. The coating formed using this formulation have a wide variety of positive benefits, including, but not limited to, corrosion protection, thermal insulation, high temperature color pigmentation, visual enhancement with metallic hues and tones.

The invention claimed is:

1. A silicon-based coating composition, comprising:
   8% to 30% (w/w of the total composition) polysilazane,
   8% to 22% (w/w of the total composition) polysiloxane, and
   30% to 45% (w/w of the total composition) high temperature silicone-based resin with a resistance up to 1200° F.,
   which composition after curing is a thermal barrier coating that can withstand temperature over 1600° F. in accordance with ASTM E1530 test standards for heat stability, having a thickness ranging between about 0.4 mil and about 1.5 mil and a hardness ranging between about 4H and about 9H.

2. The silicon-based coating composition of claim 1, comprising 10% to 15% (w/w of the total composition) polysilazane.

3. The silicon-based coating composition of claim 1, comprising 10% to 13% (w/w of the total composition) polysiloxane.

4. The silicon-based coating composition of claim 1, comprising 35% to 40% (w/w of the total composition) high temperature silicone-based resin with a resistance up to 1200° F.

5. The silicon-based coating composition of claim 1, further comprising a polysilane.

6. The silicon-based coating composition of claim 1, further comprising 25% to 45% (w/w of the total composition) an organic solvent chosen from isopropyl acetate, tert-butyl acetate, isoparaffin, and combinations thereof.

7. The silicon-based coating composition of claim 1, further comprising one or more additives chosen from pigments, matting agents, fillers, flow control agents, dry flow additives, anticratering agents, surfactants, texturing agents, light stabilizers, photosensitizers, wetting agents, anti-static agents, anti-oxidants, plasticizers, opacifiers, stabilizers, degassing agents, corrosion inhibitors, ceramic microspheres, slip agents, dispersing agents, and surface altering additives.

8. The silicon-based coating composition of claim 7, wherein the additive comprises ceramic microspheres.

9. The silicon-based coating composition of claim 7, wherein the additive comprises 1% to about 5% (w/w of the total composition) corrosion inhibitors.

10. The silicon-based coating composition of claim 1, further comprising from about 1% to about 30% mica pigments chosen from mica group minerals, silica group minerals, and combinations thereof.

11. A silicon-based coating composition, comprising:
8% to 30% (w/w of the total composition) polysilazane,
8% to 22% (w/w of the total composition) polysiloxane,
35% to 40% (w/w of the total composition) high temperature silicone-based resin with a resistance up to 1200° F.,
25% to 45% (w/w of the total composition) an organic solvent chosen from isopropyl acetate, tert-butyl acetate, isoparaffin, and combinations thereof,
1% to about 5% (w/w of the total composition) corrosion inhibitors,
polysilane, and
ceramic microspheres,
which composition after curing is a thermal barrier coating composition that can withstand temperature over 1600° F. in accordance with ASTM E1530 test standards for heat stability, having a thickness ranging between about 0.4 mil and about 1.5 mil and a hardness ranging between about 4H and about 9H.

12. The silicon-based coating composition of claim 11, comprising 10% to 15% (w/w of the total composition) polysilazane.

13. The silicon-based coating composition of claim 11, comprising 10% to 13% (w/w of the total composition) polysiloxane.

14. A method of coating a surface, which method comprises:
a. mixing 8% to 30% (w/w of the total composition) polysilazane, 8% to 22% (w/w of the total composition) polysiloxane, and 30% to 45% (w/w of the total composition) high-temperature silicone-based resin with a resistance up to 1200° F., at between 500 and 8500 rpm to form a silicon-based coating composition;
b. coating the silicon-based coating composition onto a surface; and
c. curing the coating ambiently with or without additional heat;
which coating after curing is a thermal barrier coating that can withstand temperature over 1600° F. in accordance with ASTM E1530 test standards for heat stability, having a thickness ranging between about 0.4 mil and about 1.5 mil and a hardness ranging between about 4H and about 9H.

15. The method of claim 14, wherein the composition further comprises a polysilane.

16. The method of claim 14, wherein the composition further comprises 25% to 45% (w/w of the total composition) organic solvent chosen from isopropyl acetate, tert-butyl acetate, isoparaffin, and combinations thereof.

17. The method of claim 14, wherein the composition further comprises ceramic microspheres.

18. The method of claim 14, wherein the composition further comprises 1% to about 5% (w/w of the total composition) corrosion inhibitors.

19. The method of claim 14, wherein the composition further comprises 1% to 30% (w/w of the total composition) mica pigments chosen from mica group minerals, silica group minerals, any combinations thereof.

20. The method of claim 14, wherein the surface is chosen from an aircraft, a missile, a marine vessel, a land vehicle, an equipment, a building, an appliance, a furniture, a floor, and any other exposed surface that reducing friction, protection from dragging, protection from extreme heat, ice build-up and UV degradation, and/or decreased cleaning and maintenance are desirable.

\* \* \* \* \*